March 28, 1944.  T. B. MORSE  2,345,281

ADJUSTABLE VARIABLE DIFFERENTIAL PRESSURE APPARATUS

Filed Aug. 30, 1939  2 Sheets-Sheet 1

Inventor:
Ted B. Morse,

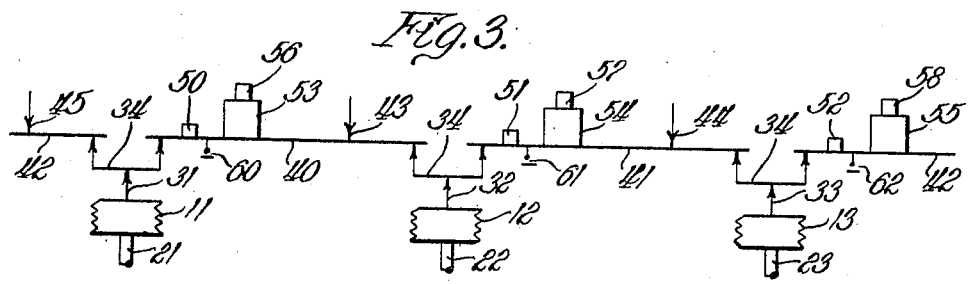
Fig. 3.
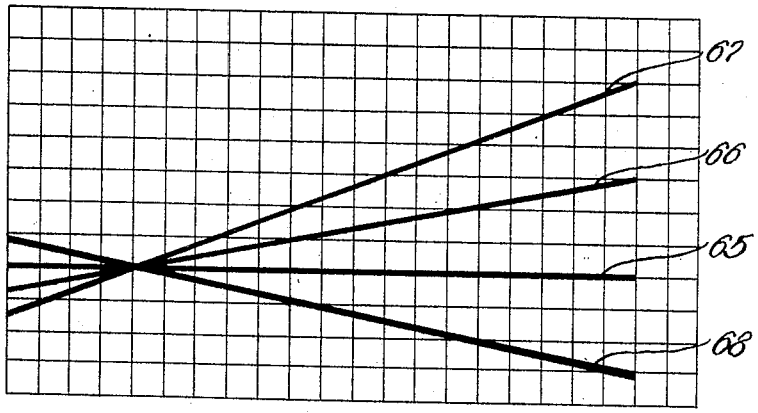
Fig. 4. OPERATING PRESSURES
EFFECT OF CHANGING INTERMEDIATE PIVOT OF MAIN LEVER
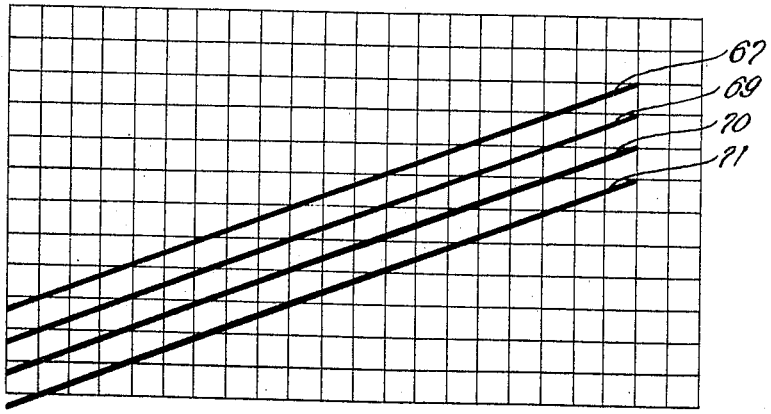
Fig. 5. OPERATING PRESSURES
EFFECT OF CHANGING POSITION OF WEIGHT ON MAIN LEVER WITH PIVOT UNCHANGED
Inventor:
Ted B. Morse Patented Mar. 28, 1944

2,345,281

UNITED STATES PATENT OFFICE 2,345,281

ADJUSTABLE VARIABLE DIFFERENTIAL PRESSURE APPARATUS

Ted B. Morse, Chicago, Ill.

Application August 30, 1939, Serial No. 292,667

11 Claims. (Cl. 74—1)

My invention relates, generally, to pressure responsive apparatus and it has particular relation to differential pressure responsive apparatus.

The object of my invention, generally stated, is to provide an improved form of differential pressure responsive apparatus that shall be simple, efficient and accurate in operation, readily adjustable, and which can be readily installed and maintained.

An object of my invention is to provide for varying the rate of change of operating differential in differential pressure apparatus.

Another object of my invention is to provide for varying the minimum value of variables to which differential pressure apparatus is responsive for different rates of change of operating differential.

A further object of my invention is to provide for changing the effect of one variable of several variables on apparatus that is arranged to be responsive to the occurrence of a predetermined difference of the several variables.

Still another object of my invention is to distribute the normally equal pressures of oil-filled electric power transmission cables, i. e., three oil-filled cables, to a series of levers predetermined movement of one or more of which in a given direction results on the occurrence of abnormal operating conditions, i. e., low or high pressure in one of the cables or low pressure in all of them.

A further object of my invention is to provide means responsive to the occurrence of abnormal conditions of gas pressure in oil-filled cables and in reservoirs connected thereto.

Other objects of my invention will, in part, be obvious and in part appear hereinafter.

My invention, accordingly, is disclosed in the embodiment thereof shown in the accompanying drawings, and it comprises the features of construction, combination of elements and arrangement of parts which will be exemplified in the construction hereinafter set forth, and the scope of the application of which will be indicated in the appended claims.

For a more complete understanding of the nature and scope of my invention, reference may be had to the following detailed description, taken in connection with the accompanying drawings, in which:

Figure 3 illustrates, diagrammatically, the lever arrangement employed in my novel apparatus; and Figures 4 and 5 show a number of curves which demonstrate the characteristics possessed by apparatus constructed in accordance with my invention.

Figure 1:
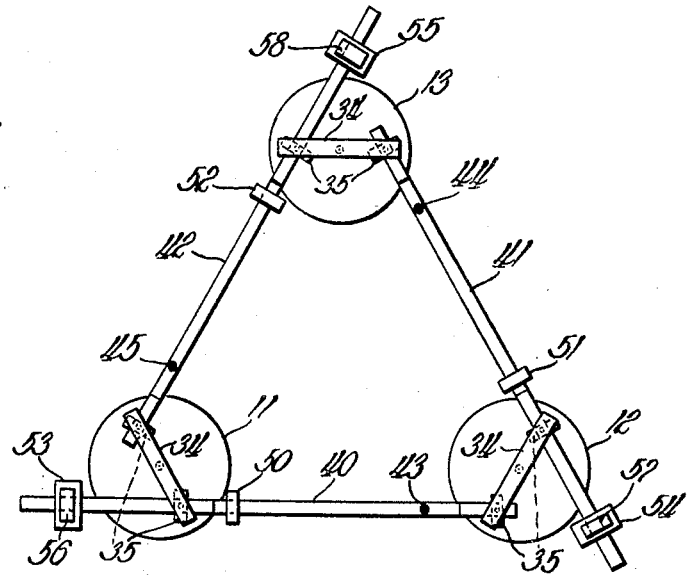
Figure 1 is a top plan view of my improved form of differential pressure apparatus.
Figure 2:
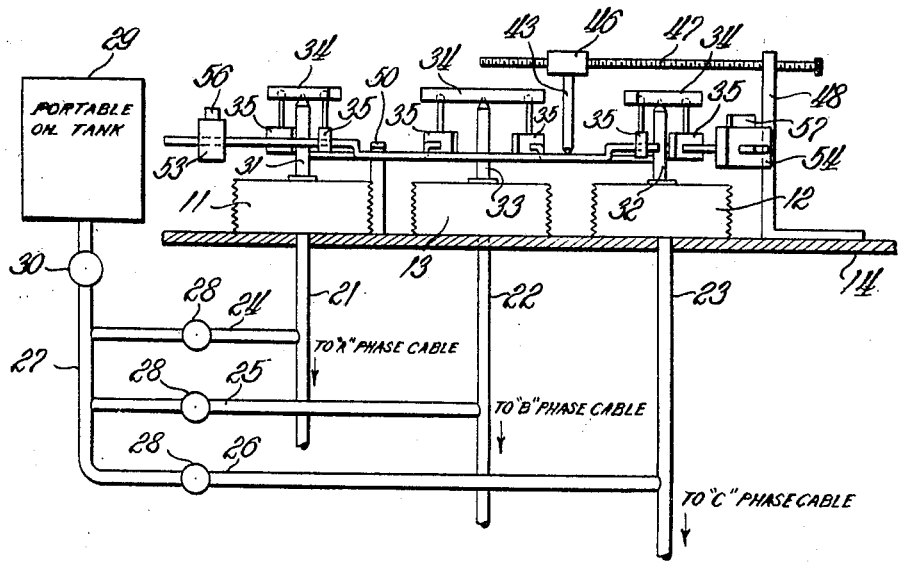
Figure 2 is an elevational view of the apparatus shown in Figure 1 and illustrating one arrangement of the conduits, i. e., oil or gas paths.

Referring now particularly to Figures 1 and 2 of the drawings, it will be observed that the reference characters 11, 12 and 13 designate, respectively, flexible bellows each of which is positioned on a suitable base plate 14 at one apex of a polygon that may be an equilateral triangle, as shown. The flexible bellows 11, 12 and 13 are hermetically sealed and oil or gas pressure is applied thereto by conduits 21, 22 and 23, respectively, which are connected, as shown, to the "A," "B" and "C" phase cables. It will be understood that the flexible bellows 11, 12 and 13 are normally filled with oil or gas from the individual phase cables and that the forces exerted by the flexible bellows depend upon the pressure in the respective cables or reservoirs. Since the cables or reservoirs are all subjected to substantially the same operating conditions, substantially the same pressures are present in each of them and, accordingly, the positions of the flexible bellows 11, 12 and 13 are normally substantially identical. Upon the increase or decrease of pressure in one cable relative to the other two, the force in the flexible bellows individual thereto will correspondingly vary relative to the other two bellows. Such difference indicates that an abnormal condition has occurred due, for example, to loss of oil in one phase cable or to overheating of one phase cable, which requires prompt attention to minimize the resultant damage.

Instead of the flexible bellows 11, 12 and 13, other pressure responsive elements, such as pistons or diaphragms, can be used.

In some instances the oil in one of the phase cables may be depleted due to leakage. Ordinarily there is an excess of oil in each of the phase cables so that, for emergency purposes, it may be desirable to interconnect the phase cables, in so far as the oil system is concerned. For this purpose the conduits 21, 22 and 23 are connected, respectively, by conduits 24, 25 and 26, to a common conduit 27 through valves 28. Assuming, for example, that the oil level of the "A" phase cable is low, then the valves 28 can be opened and oil from the "B" and "C" phase cables can gradually flow into the "A" phase cable until the pressure in the latter has been raised, while the pressure in the former is correspondingly lowered.

Also, in some instances, it may be desirable to provide an emergency supply of oil for one or all of the phase cables. For this purpose a portable oil tank 29 can be temporarily connected to the common conduit 27 through a valve 30. On opening of the valve 30 and one or more of the valves 28, the pressure in one or more of the phase cables can be restored.

Because of the particular compact character of my novel apparatus and arrangement thereof it is possible to provide in a single assembly with the apparatus the interconnecting conduit arrangement comprising the conduits 24, 25, 26 and 27. When it is recalled that apparatus of this type is located in manholes and the like, where space is extremely restricted, the advantages of this compact arrangement will at once be obvious.

The occurrence of a differential of pressure beyond a certain value in any one of the phase cables is accompanied by a corresponding movement of the flexible bellows individual thereto. Advantage is taken of this movement to provide an indication of the same. For this purpose, each of the flexible bellows 11, 12 and 13 is provided, respectively, with a pivot 31, 32 and 33 which moves in a vertical direction on corresponding movement of the individual bellows. On the upper end of each of the pivots 31, 32 and 33 there is mounted an auxiliary lever 34 from the ends of which stirrups 35 depend. The stirrups 35 may be mounted for universal movement in the ends of the auxiliary levers 34 by any suitable means, such as a ball and socket arrangement, as shown, or by suitable pin joints, etc. Main levers 40, 41 and 42 are carried by adjacent pairs of stirrups 35 and they are pivoted on pivots 43, 44 and 45, respectively.

Under normal operating conditions the main levers 40, 41 and 42 may occupy the coplanar, horizontal positions shown in the drawings. They move or tend to move from these positions in accordance with changes in pressure in the conduits 21, 22 and 23. Since the apparatus is intended to be responsive to differences in pressures between the conduits 21, 22 and 23, it is constructed so as to be responsive thereto, i. e. to the differential pressure between conduits 21 and 22, 22 and 23, and 23 and 21. When a differential pressure is sufficient to effect a predetermined function, i. e., to close a signalling circuit, it is considered herein as an operating differential pressure or operating differential. In other words the term "operating differential," as used herein, refers to the pressure difference between conduits 21 and 22, or 22 and 23, or 23 and 21 that is required to cause the apparatus to perform its intended function.

Since it is desirable to vary the increase or decrease of the operating differential with increase in operating pressure to take care of certain inherent different operating characteristics of each of the phase cables which tend to increase with increase in pressure or to take care of different operating characteristics of different oil sections, each of the pivots 43, 44 and 45 is arranged to be adjustable. Any suitable means can be employed for providing this adjustment. For example, as shown in Figure 2 of the drawings, the pivot 43 may be carried by a nut 46 that is mounted on a threaded shaft 47, carried by a suitable support 48 on the base plate 14.

The curves shown in Figure 4 of the drawings illustrate the effect of the changing of the position of the pivot of one of the main levers. More detailed reference to these curves will be set forth hereinafter.

It is desirable to limit the upward movement of the main levers 40, 41 and 42, in a clockwise direction considering Figure 2, and for this purpose stops 50, 51 and 52 are provided. Since a uniform increase in pressure on all of the phase cables does not indicate that a fault has occurred, there is no necessity for providing an indication of the occurrence of such condition. Moreover, the provision of the stops 50, 51 and 52 simplifies the construction of the apparatus and increases its sensitivity to the occurrence of differential operating pressures. This is due to the fact that the rotation of the main levers 40, 41 and 42 about their respective pivots 43, 44 and 45 in one direction is limited and only a slight rotation in the opposite direction is required for the apparatus to perform its intended function.

With a view to changing the operating pressure for given positions of the pivots 43, 44 and 45 of the main levers 40, 41 and 42, weights 53, 54 and 55, individual to each of the main levers, are provided as shown. These weights are adjustable along the main levers in order to effect corresponding changes in the operating pressures. The values of the weights may also be changed to vary the operating characteristic, as will be readily apparent. The effect of the changes in positions of the weights 53, 54 and 55 is illustrated by the curves in Figure 5 of the drawings, to which more detailed reference will be made hereinafter.

Under certain operating conditions it may be desirable to change the adjustment of the apparatus so that it will continue to perform its normal function even though the oil pressure in one of the phase cables is lower or higher than the pressure in the other two cables. If there has been a loss of oil in the one cable so that pressure in it has been reduced, but the amount of oil remaining is sufficient to protect the cable, then it is desirable to compensate for this reduced pressure in the one cable and restore the apparatus to normal operating condition. For this purpose, auxiliary weights 56, 57 and 58 are provided, any one of which may be readily attached or mounted on the main weights 53, 54 or 55, respectively, as shown, or along the main levers 40, 41 and 42.

Movement of the main levers 40, 41 and 42 about the respective pivots 43, 44 and 45 in a counterclockwise direction as viewed in Figure 3 of the drawings indicates that a differential pressure condition exists. Movement beyond a predetermined extent, caused by the occurrence of an operating differential, indicates that a fault has occurred such as a leak on one of the cables, accompanied by a loss in pressure, or one of the cables has become overheated, which is accompanied by a rise in pressure. Any suitable means can be employed for indicating to an operator that a fault has occurred. For example, normally open contact members 60, 61 and 62 can be provided for the main levers 40, 41 and 42, respectively. Obviously, normally closed contact members can be used. Under normal operating conditions these contact members will remain open. However, upon the occurrence of a fault, one set of contact members will be closed. Advantage may be taken of this arrangement to directly operate an alarm signal or to initiate the operation of a suitable code transmitter for indicating at a central station the occurrence of a fault and its location. Since it will be obvious that any suitable alarm system may be employed under the control of the contact members 60, 61 and 62, no further description thereof will be set forth herein. If desired, the contact members can be employed to initiate certain control functions such as the opening of a valve, such as one of the valves 28, to permit the oil to redistribute itself or to permit additional oil to replace that lost by leakage, or to start one or more pumps into operation to restore gas pressure.

Referring now to the curves shown in Figure 4 of the drawings, it will be observed that they indicate how the operating differential changes with change in operating pressure for different positions of the pivots of the main levers. The horizontal line 65 shows that, when the pivot of the main lever is midway between the end pivots on the supporting stirrups 35, there is no change in operating differential. The lines 66 and 67 show that the operating differential increases with increase in pressure when the pivot point of the main lever is moved from the midposition to the right, as shown in Figure 3 of the drawings. This increase in operating differential is desirable for the reasons stated. When the pivot point is moved in the opposite direction the line 68 shows that the operating differential decreases with increase in pressure.

In Figure 5 of the drawings, the lines 69, 70 and 71 illustrate the changes in minimum operating pressures for different positions of the main weights. As the weights are moved further and further to the left as viewed in Figure 3 of the drawings, there is a corresponding decrease in differential pressure although the slope of each curve remains the same. Curve 71 shows that, when the operating differential is zero, the apparatus will perform its intended function, such as closing the contact members 60, 61 or 62, even though the pressures applied to the bellows 11, 12 and 13 are identical.

When the differential pressure apparatus, according to the present invention, is installed for operation, the positions of the pivots 43, 44 and 45 and of the main weights 53, 54 and 55 are adjusted to give the desired operating characteristics. Ordinarily, when once adjusted, no further adjustments are required to take care of seasonal changes such as changes in temperature or pressure. Since the operation of the apparatus does not depend upon the use of resilient biasing forces, but rather is dependent solely upon the positions of the pivots and the weights, the apparatus, when once adjusted, accurately maintains its adjustment.

Upon the occurrence of a fault, such as a lowering of the oil pressure in one of the phases due to oil leakage, one of the sets of contact members 60, 61 or 62 will be closed. The alarm will be given and appropriate steps may be taken to correct for the fault. As previously indicated, such a fault may result in the loss of some oil on the faulty cable. After the leak has been repaired, it may not be feasible to refill the cable with oil to its original level. In order to restore the apparatus to its normal operating condition with the oil level in one of the phases different from that in the other phases, or with the pressure on one of the phases lower than the pressure on the other phases, it is only necessary to suitably apply the auxiliary weights 56, 57 and 58 to take care of this condition. Since this does not involve a change in the positions of the pivots 43, 44 and 45, or of the main weights 53, 54 and 55, it can be done by a relatively inexperienced workman. It is only necessary to instruct him to properly apply certain of the auxiliary weights to restore the relay to its normal operating condition.

Since certain further changes may be made in the above construction, and different embodiments of the invention can be made without departing from the scope thereof, it is intended that all matter contained in the foregoing description or shown in the accompanying drawings shall be interpreted as illustrative, and not in a limiting sense.

I claim as my invention:

1. Differential pressure apparatus comprising, in combination, at least three pressure responsive elements, each element being adapted to be connected to a separate and distinct pressure source so as to exert a force in accordance with the pressure of its pressure source, two levers for each element pivoted intermediate their ends for interconnecting it with two other elements, a rigid member individual to each element and operatively connected to both levers individual thereto for substantially equally dividing between said rigid arms said force resulting from the pressure applied to the element, and adjustable weight means cooperating with at least one of said levers for varying the minimum pressure to which said one lever is operatively responsive.

2. Differential pressure apparatus comprising, in combination, at least three pressure responsive elements, each element being adapted to be connected to a separate and distinct pressure source so as to exert a force in accordance with the pressure of its pressure source, two levers for each element pivoted intermediate their ends for interconnecting it with two other elements, a rigid member individual to each element and operatively connected to both levers individual thereto for substantially equally dividing between said rigid arms said force resulting from the pressure applied to the element, means for adjusting the pivot point of each lever whereby the operating differential between the pressures applied to said elements can be varied, and adjustable weight means cooperating with each of said levers for varying the minimum pressures to which the apparatus is responsive.

3. Differential pressure apparatus comprising, in combination, at least three pressure responsive elements, each element being adapted to be connected to a separate and distinct pressure source so as to exert a force in accordance with the pressure of its pressure source, two levers for each element pivoted intermediate their ends for interconnecting it with two other elements, a rigid member individual to each element and operatively connected to both levers individual thereto for substantially equally dividing between said rigid arms said force resulting from the pressure applied to the element, adjustable weight means cooperating with each of said levers for varying the minimum pressures to which the apparatus is responsive, and additional weight means cooperating with one or more of said levers for independently varying the pressures to which one or more of said levers is responsive.

4. Differential pressure apparatus comprising, in combination, a pressure responsive element located at each of the apices of a polygon, each element being adapted to be connected to a separate and distinct pressure source, auxiliary levers pivotally mounted intermediate their ends on said elements, main levers pivotally mounted intermediate their ends between said elements, and means pivotally interconnecting said auxiliary levers with said main levers.

5. Differential pressure apparatus comprising, in combination, a pressure responsive element located at each of the apices of a polygon, each element being adapted to be connected to a separate and distinct pressure source, auxiliary levers pivotally mounted intermediate their ends on said elements, main levers pivotally mounted intermediate their ends between said elements, means pivotally interconnecting said auxiliary levers with said main levers, and means for adjusting the pivot point of each main lever whereby the operating differentials between the pressures applied to said elements are variable.

6. Differential pressure apparatus comprising, in combination, a pressure responsive element located at each of the apices of a polygon, each element being adapted to be connected to a separate and distinct pressure source, auxiliary levers pivotally mounted intermediate their ends on said elements, main levers pivotally mounted intermediate their ends between said elements, means pivotally interconnecting said auxiliary levers with said main levers, and adjustable weight means cooperating with each main lever for varying the minimum pressures to which the apparatus is responsive.

7. Differential pressure apparatus comprising, in combination, a pressure responsive element located at each of the apices of a polygon, each element being adapted to be connected to a separate and distinct pressure source, auxiliary levers pivotally mounted intermediate their ends on said elements, main levers pivotally mounted intermediate their ends between said elements, means pivotally interconnecting said auxiliary levers with said main levers, and stop means individual to each main lever for limiting movement thereof beyond a predetermined extent in a direction corresponding to increase in said pressures, movement of said main levers from said stop means through a predetermined extent taking place upon the occurrence of abnormal operating conditions.

8. Differential pressure apparatus comprising, in combination, two or more pressure responsive elements, each element being adapted to be connected to a separate and distinct pressure source so as to exert a force in accordance with the pressure of its source, auxiliary levers pivotally mounted intermediate their ends on said elements, main levers pivotally mounted intermediate their ends between said elements, and means pivotally interconnecting said auxiliary levers with said main levers whereby the force of each element is divided between said main levers in a predetermined ratio.

9. Differential pressure apparatus comprising, in combination, two or more pressure responsive elements, each element being adapted to be connected to a separate and distinct pressure source so as to exert a force in accordance with the pressure of its source, auxiliary levers pivotally mounted intermediate their ends on said elements, main levers between said elements, means pivotally mounting said main levers at points spaced from their midpoints and adjacent said elements, and means pivotally interconnecting said auxiliary levers with said main levers whereby the force of each element is divided between said main levers in a predetermined ratio.

10. Differential pressure apparatus comprising, in combination, two or more pressure responsive elements, each element being adapted to be connected to a separate and distinct pressure source so as to exert a force in accordance with the pressure of its source, auxiliary levers for said elements, means pivotally mounting said auxiliary levers midway their ends on said elements, main levers pivotally mounted intermediate their ends between said elements, and means pivotally interconnecting said auxiliary levers with said main levers whereby the force of each element is divided equally between said main levers.

11. Differential pressure apparatus comprising, in combination, two or more pressure responsive elements, each element being adapted to be connected to a separate and distinct pressure source so as to exert a force in accordance with the pressure of its source, auxiliary levers for said elements, means pivotally mounting said auxiliary levers midway their ends on said elements, main levers between said elements, means pivotally mounting said main levers at points spaced from their midpoints and adjacent said elements, and means pivotally interconnecting said auxiliary levers with said main levers whereby the force of each element is divided equally between said main levers.

TED B. MORSE.